United States Patent [19]
Cormack et al.

[11] 4,106,778
[45] Aug. 15, 1978

[54] DEVICE FOR TEMPORARILY SEALING AND SUPPORTING SHAFTS

[75] Inventors: Alexander D. Cormack, Portland, Oreg.; Boris Kool, Pittsfield, Mass.

[73] Assignee: Beloit Corporation, Beloit, Wis.

[21] Appl. No.: 660,514

[22] Filed: Feb. 23, 1976

[51] Int. Cl.² .............................................. F16J 15/06
[52] U.S. Cl. .......................................... 277/9.5; 277/1
[58] Field of Search ................... 277/1, 9, 9.5, 11, 27

[56] References Cited

U.S. PATENT DOCUMENTS

| | | | |
|---|---|---|---|
| 1,572,394 | 2/1926 | Krebs | 277/9 |
| 3,222,075 | 12/1965 | Haeber | 277/9 |
| 3,743,302 | 7/1973 | Bach | 277/65 |
| 4,008,897 | 2/1977 | Wentworth | 277/9 |

*Primary Examiner*—Robert I. Smith

*Attorney, Agent, or Firm*—Hill, Gross, Simpson, Van Santen, Steadman, Chiara & Simpson

[57] ABSTRACT

A primary seal for a normally operatively moveable shaft which may extend into fluid under pressure is adapted to be worked on without axially shifting the shaft, by secondarily sealing the shaft intermediate the primary seal and the fluid, thereby permitting working access to, removal and replacement of, the primary seal.

Temporary support of the shaft while it remains in its operating position but separated from a primary supporting structure at one end is effected by activating selectively operable supporting means into supporting relation to an intermediate portion of the shaft, and from which the supporting means is inactivated when said one end is supported by the primary supporting structure.

22 Claims, 5 Drawing Figures

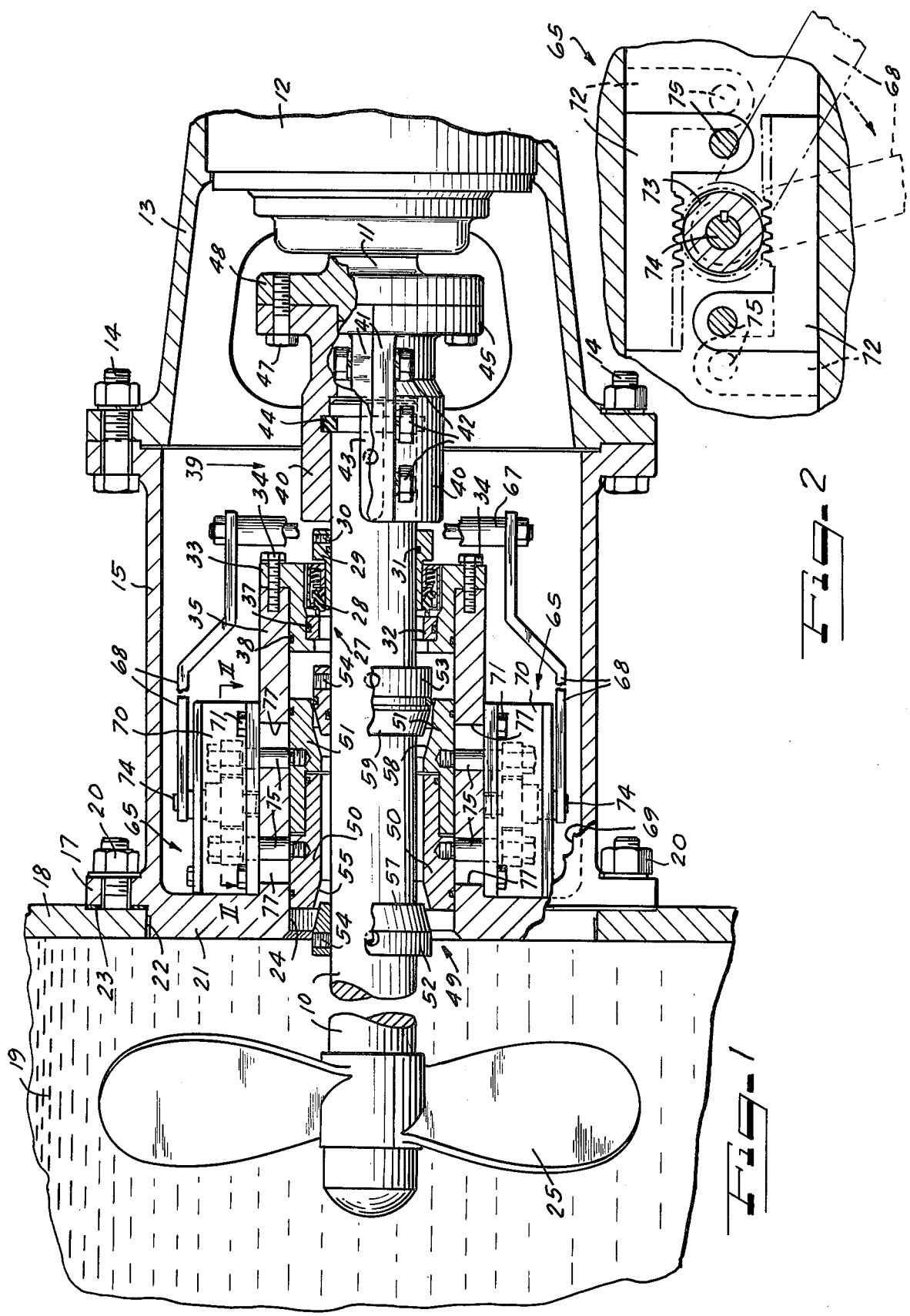

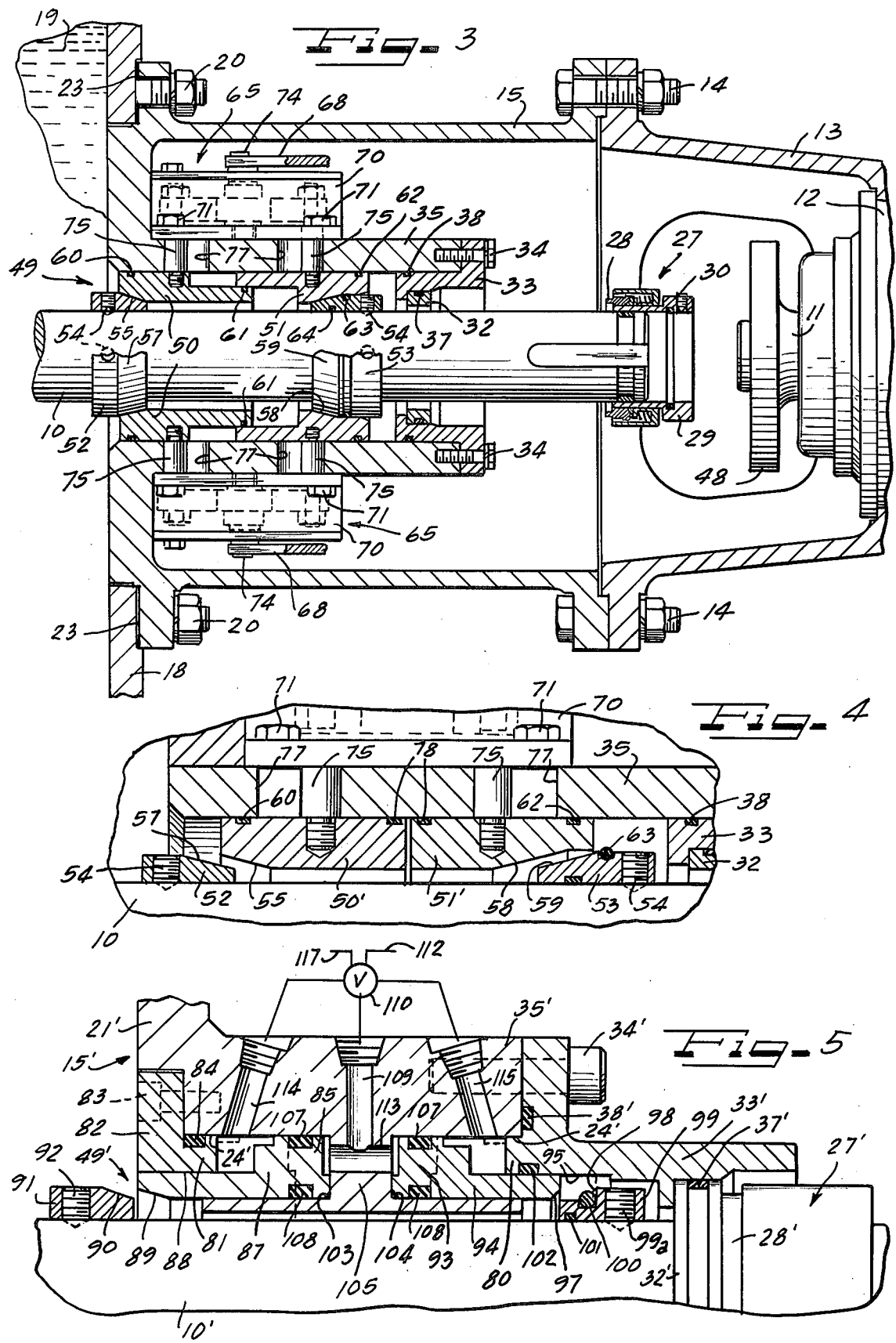

DEVICE FOR TEMPORARILY SEALING AND SUPPORTING SHAFTS

This invention relates to new and improved devices for temporarily sealing and supporting shafts.

In U.S. Pat. No. 2,911,290 there is disclosed an expedient for removal and replacement of a so-called mechanical seal by necessarily relatively axially moving the shaft components, i.e., either or both the shaft component which extends into a receptacle and the shaft component which is associated with means for driving the shaft. Excesive working space or headroom is required, and rather complex procedures and arrangements of parts are needed.

An important object of the present invention is to overcome the disadvantages, deficiencies, inefficiencies, shortcomings and problems in prior expedients concerned with working on or in relation to shafts, e.g. replacing, the primary seals of shafts which necessarily operate in a fluid environment which may be under pressure.

Another object of the invention is to provide new and improved simple and efficient means for temporarily sealing a shaft extending into fluid which may be under pressure while primary sealing means for the shaft are being worked on.

A further object of the invention is to provide a new and improved means for efficiently temporarily supporting a shaft in its normal working orientation relative to a primary support from which the shaft is or has been separated.

Still another object of the invention is to provide new and improved means for temporarily supporting and sealing a shaft relative to fluid into which the shaft extends.

According to features of the invention there is provided means whereby normally inactive temporary or secondary sealing means are adapted to be located about a portion of a shaft between a fluid into which the shaft extends and a primary sealing means on the shaft, actuating means being operable for activating the secondary sealing means to effect a fluid retaining seal about the shaft, without axial shifting of the shaft, so that the primary sealing means can be released from sealing relation to the shaft substantially without leakage of fluid past the shaft, the actuating means being operable to inactive the secondary sealing means relative to the shaft after the primary sealing means have been caused to resume sealing relation to the shaft.

According to other features of the invention, there is provided a device for temporarily supporting a normally operatively moveable shaft when one end of the shaft is separated from primary shaft supporting and driving means, comprising, normally inactive secondary shaft supporting means located about an intermediate portion of the shaft, and actuating means operable for activating said supporting means to effect stabilized support of the shaft without axial shifting of the shaft while the shaft is separated from said driving means, the actuating means being operable to inactive said supporting means relative to the shaft after said one end of the shaft has been rejoined to the supporting and driving means.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 1 is a fragmental longitudinal sectional elevational view showing a shaft installation embodying features of the invention.

FIG. 2 is an enlarged fragmentary sectional plan view taken substantially along the line II—II of FIG. 1.

FIG. 3 is a sectional elevational view similar to FIG. 1, but showing parts of the structure in a different relationship.

FIG. 4 is a fragmentary longitudinal sectional detail view showing a slightly modified temporary shaft sealing and supporting arrangement; and FIG. 5 is a fragmentary longitudinal sectional view showing another modified temporary sealing and supporting arrangement.

By way of example, there is depicted in FIG. 1 a shaft 10 which is operatively supported by primary supporting means comprising a drive shaft 11 forming part of an actuator system which may comprise a motor, engine or the like and of which an element 12 is depicted carrying the drive shaft 11 and mounted in a hollow frame part 13 which may be flanged and removably secured as by means of bolts 14 to a flanged end of a tubular concentric frame member 15. At its opposite end, the frame member 15 has a mounting flange 17 adapted to engage a barrier such as a wall 18 confining a fluid 19 such as an industrially valuable liquid where the wall 18 is part of a receptacle, i.e. storage tank, agitator or housing, or the like. On the other hand the barrier 18 may be part of the hull or propeller shaft housing of a marine vessel, or the like. In any event, the mounting flange 17 may be removably secured to the barrier wall 18 as by means of bolts 20 with a centering boss projection 21 integral with the adjacent end of the frame member 15 extending concentrically into an opening 22 in the wall 18. Sealing means such as a gasket 23 may be provided between the flange 17 and the wall 18. A working end portion of the shaft 10 extends in free clearance relation through an opening 24 in the centering boss 21 which provides, except for the opening 24, a closure for the opening 22. At its inner extremity, the working end portion of the shaft 10 carries any preferred working implement such as an agitator or propeller 25.

For sealing the shaft 10 against leakage of fluid thereby, primary sealing means 27 are provided, preferably in the form of a so-called mechanical seal. In one desirable form, the primary seal 27 comprises a sealing ring 28 carried on a collar 29 secured as by means of one or more sets screws 30 onto the shaft 10 adjacent to its end which is operatively supported by the drive shaft 11. A sealing ring 31 prevents leakage between the shaft and the seal collar 29. Dynamic sealing is effected by biasing of the sealing ring 28 axially toward and against an oppositely axially confronting surface of a ring 32 carried by a mounting ring flange 33 secured as by means of screws 34 to the distal end of a tubular extension housing 35 integral with and projecting outwardly from the boss 21 concentrically about the opening 24 and thus in concentric spaced relation to the shaft 10. Sealing rings 37 and 38 seal the ring 32 and the flange member 33 against fluid leakage from within the housing 35. In operation, the sealing ring 28 slidably engages the stationary ring 32 and dynamically seals the shaft 10 against leakage past the housing 35.

In order to permit working on the primary seal 27, such as to replace the dynamic sealing ring 28 when it becomes worn, the means are provided for secondarily sealing the shaft 10 against leakage for supporting the shaft 10 intermediate the primary seal and the working or propeller end of the shaft, and permitting the shaft 10 to be uncoupled in separated relation to the drive shaft 11, thereby freeing the normally coupled end of the shaft 10 for removal and replacement of the primary seal 27. To this end, a longitudinally split, clamp-on coupling structure 39 operatively connects the adjacent ends of the shafts 10 and 11 in axially spaced relation. Complementary halves 40 of the coupling 39 embrace the end portion of the shaft 10 axially outwardly beyond the primary seal 27 and are secured together in clamping relation by means of longitudinally extending lateral flanges 41 fastened together by means of bolts 42. A longitudinal key 43 maintains a corotational relationship of the coupling 39 to the shaft 10, and an annular key 44 maintains the shaft 10 and the coupling against relative axial displacement. At its end adjacent to the drive shaft 11, the coupling assembly has a lateral annular attachment flange structure 45 detachably secured as by means of bolts to a lateral annular flange 48 corotative with and preferably integral with the end of the drive shaft 11. When it is desired to remove the coupling 39, that can be readily effected by removal of the bolts 42 and 47 and the split halves 40 of the coupling separated from the shaft 10 whereby to leave a substantial separation gap between the ends of the shafts 10 and 11.

Means comprising a device for secondarily sealing and supporting the shaft 10 are constructed and arranged to be normally inactive and are adapted to be located about an intermediate portion of the shaft between its working end and the primary sealing means 27. In one desirable arrangement, the secondary sealing and supporting device 49 comprises a pair of relatively longitudinally reciprocatable wedging ring members 50 and 51 slidably supported within the preferably cylindrical tubular housing 35 and selectively engageable with complementary respective shoulder collars 52 and 53 fixedly mounted on the shaft 10.

In the arrangement shown in FIGS. 1 and 3, the wedging rings 50 and 51 are moveable between a close-together released, inactive position where they are free from the collars 52 and 53, and a sealing, shaft-supporting position where the wedging rings are engaged with the collars. For this purpose, the collars 52 and 53 are fixedly secured to the shaft in suitably spaced relation to one another as by means of setscrews 54. In the inactive condition of the wedging rings and collars oblique wedgingly engageable annular surfaces 55 and 57 on respectively the wedging ring 50 and the collar 52 are in separated relation as shown in FIG. 1. Similarly, complementary oblique annular wedging surfaces 58 and 59 on respectively the wedging ring 51 and the collar 53 are in spaced relation. Therefore, the shaft 10 is adapted to run freely as motivated by the drive shaft 11 which provides support for the shaft through the coupling 39, the seal 27 functioning dynamically to prevent leakage of the fluid 19 past the shaft.

By activating the temporary sealing and supporting device 49, the shaft 10 is adapted to be supported in the absence of the coupling 39, as shown in FIG. 3, permitting the seal assembly 27 to be moved past the free end of the shaft, either for initial assembly and mounting with respect to the shaft or for removal and replacement. For this purpose, the wedging rings 50 and 51 are relatively axially moved apart to effect shaft-supporting and sealing engagement with the collars 52 and 53. Thereby, without axial shifting of the shaft 10 from its working position, it is firmly supported and sealed against leakage. To assure thorough secondary sealing of the thus secondarily supported shaft, sealing means in the form of a ring 60 seals the joint between the wedging ring 50 and the cylindrical surface of the housing 35, a sealing ring 61 seals a telescopic slip joint between the rings 50 and 51, a sealing ring 62 seals the joint between the wedging ring 51 and the cylindrical surface of the housing 35, a sealing ring 63 seals a separable slip joint between the collar 53 and the wedging ring 51, and a sealing ring 64 seals the joint between the collar ring 53 and the shaft 10. Thereby, in the activated relation of the secondary supporting and sealing means 49, leakage past the shaft 10 is substantially precluded. By virtue of the substantially axially spaced engagement of the wedging rings 50 and 51 with the shaft through the collars 52 and 53, a thoroughly stable support of the shaft 10 against canting or axial displacement is assured. Thereby, the secondary sealing and supporting device 49 is efficiently useful for either horizontal or vertical working disposition of the shaft 10, or any preferred angular position of the shaft between horizontal and vertical.

Actuation of the device 49 may be effected in any preferred manner, such as mechanically, or by hydraulic fluid pressure or pneumatic. By way of example, rack and pinion actuating means have been depicted comprising, for stabilized, smooth and efficient operation, a pair of preferably identical diametrically opposite coactive acutators 65 operatively coupled with the wedging rings 50 and 51 adapted to be selectively operated by suitable actuating means comprising a handle 67 having bail-like arms 68 and moveable through a suitable opening or openings 69 in one side of the housing 15.

Each of the actuators 65 comprises a suitable housing structure 70 secured as by means of bolts 71 to the outside of the housing 35 and providing a longitudinal guidway for a pair of opposed, spaced slidably mounted actuator rack members 72 (FIG. 2) in mesh with a pinion 73 keyed to a shaft 74 rotatably supported on a fixed axis by the associated housing 70 and to which one of the arms 68 is fixed to rotate the shaft 74 and thereby the pinion 73. Operating connection between the wedging rings 50 and 51 and respective ones of the rack members 72 is effected by means of coupling pins 75 extending through respective clearance slots 77 in the wall of the housing 35. In the inactive condition of the sealing and supporting device 49, the rack members 72 may be in the generally transversely aligned orientation as shown in full line in FIG. 2 and wherein the arms 68 will be in the position exemplified in dot-dash phantom outline. To activate the device, the actuating handle is moved to drive the pinion 73 in clockwise direction, as viewed in FIG. 2 wherein the arms 68 will be in substantially the dash outline phantom position shown and the actuator rack members 72 will assume the dash outline position shown, and wherein the wedging rings 50 and 51 will be in the shaft sealing and supporting relation exemplified in FIG. 3. Thus, by simply manipulating the handle 67, the actuating device 49 can be easily and quickly activated and inactivated without axial shifting of the shaft 10.

If preferred, as shown in FIG. 4, the wedging rings 50' and 51' may have their adjacent ends continuous instead of stepped and overlapped as shown in FIG. 1, with sealing ring means 78 sealing the joint between such adjacent ends of the wedging rings and the inner cylindrical wall surface of the housing 35. Otherwise, the construction may be substantially the same as in FIGS. 1-3.

Another form of means for temporarily sealing and supporting a shaft is depicted in FIG. 5. Instead of mechanical actuation of the temporary shaft sealing and actuating device, as exemplified in FIGS. 1-4 actuating means comprising a pressure fluid system and control means are provided in a device 49' which functions similarly to the mechanically actuated device 49 but is activated and inactivated by pneumatic or hydraulic fluid pressure. For this purpose, the shaft 10' extends, similarly as in FIG. 1, in normally freely spaced relation through a tubular housing portion 35' integral with a frame 15' having an annular closure 21' in a barrier such as a tank receptacle or marine installation. The temporary sealing and supporting device 49' is adapted to be actuated for sealing and supporting the shaft 10' when the latter is released from primary supporting means which may be similar to and to which the shaft 10' may be separably coupled in the manner described in connection with FIGS. 1 and 3 for the purpose of working on, i.e., removing and replacing the primary seal assembly 27' which includes the dynamic sealing ring 28' sealingly biased axially against the ring 32'.

In order to accommodate pressure fluid actuation of the device 49', the annular angular flange member 33' which is secured to the end of the housing 35' by means of the bolts 34' is modified to extend generally from the end of the housing 35' with an annular centering boss 80 fitting a short distance into the preferably cylindrical radially inner surface 24' of the housing 35', and the sealing ring 38' sealing the joint between the member 33' and the housing 35'. Through this arrangement the axially facing surface of the boss 80 provides one end closure for a fluid pressure working chamber area, the opposite end closure of which is provided by means of a boss 81 extending into the cylinder 24' from an annular flange member 82 secured to the closure member 21' as by means of screws 83, with the joint between the contiguous surfaces of the flange 82 and the housing 15' being sealed by means of a sealing ring 84. Within the cylinder area between the bosses 80 and 81 is accommodated a radially outwardly enlarged pistin portion 85 on a wedging ring 87 which is reciprocatingly slidably supported within a cylinder surface 88 on the inner diameter of the flange member 82. At its end portion remote from the piston enlargement 85, the wedging member 87 has an oblique wedging surface 89 which is supportingly engageable with a complementary annular oblique shoulder surface 90 on a collar 91 secured as by means of a setscrew 92 to the shaft 10'. In that portion of the cylinder area nearest the boss 80, the annular radially outward piston enlargement 93 of a reciprocatable wedging ring 94 is slidably engaged with the cylinder surface 24' and the smaller diameter portion of the wedging ring 94 is slidably engaged a complementary cylindrical surface 95 on the flange 33'. An oblique wedging and sealing surface 97 on the wedging ring 94 is engageable with a complementary oblique shoulder surface 98 on a collar 99 secured to the shaft 10' as by means of one or more setscrews 99a and carrying sealing ring 100. It will be observed that, similarly as the wedging ring 51 and the shoulder collar ring 53 in FIG. 3, the wedging ring 94 on the collar ring 99 have axially extending cylindrical supporting bearing surfaces in addition to the oblique wedging bearing surfaces. A sealing ring 101 seals the joint between the shoulder collar 99 and the shaft 10', and a sealing ring seals the joint between the flange 33' and the housing 35'.

To facilitate fluid pressure actuation of the wedging rings 87 and 94, the housing 35' is of sufficient radial dimension to provide an axially opening blind end annular cylinder groove 103 for the piston head portion 85 of the wedging ring 87, and an oppositely axially opening aligned annular cylinder groove 104 for the piston head 93 of the wedging ring 94, with an intervening generally solid abutment portion 105 separating the cylinder grooves 103 and 104. Suitable fluid sealing rings 107 seal the joint between the radially outer surfaces of the piston heads 85 and 93 and the cylinder surface 24', and respective sealing rings 108 seal the joint between the piston heads and the engaged radially inner surfaces of the grooves 103 and 104.

For activating the device 49', pressure fluid is adapted to be supplied through a generally radial passage port 109 communicating in its outer end through a control valve 110 with a pressure fluid supply line 112 leading from any suitable pressure source (not shown). At its inner end, the passage port 109 communicates with a cross port 113 opening through the blind ends of the bores 103 and 104 to expose the adjacent ends of the piston heads 85 and 93 to pressure fluid force for driving the wedging rings 87 and 94 into their secondary sealing and supporting position with respect to the shoulder collars 91 and 99. During pressure fluid activating driving of the wedging rings, the working chamber cylinder areas between the piston heads 85 and 93 and the bosses 81 and 80, respectively, are drained off through respective passage posts 114 and 115 communicating through the control valve 110 with a drain line 117. When it is desired to release the wedging rings 87 and 94 to inactivate the device 49', the valve 110 is operated to connect the passage port 109 to the drain line 117 and to connect the passage ports 114 and 115 to the pressure line 112. It will be understood, of course, that the sequence of activating and inactivating the device 49' will follow substantially the sequence described in respect to the device 49 of FIGS. 1 and 3.

It will be understood that variations and modifications may be effected without departing from the spirit and scope of the novel concepts of this invention.

We claim as our invention:

1. A device for temporarily sealing a normally operatively movable shaft which may extend at one end into fluid under pressure, while primary shaft sealing means adjacent the opposite end of the shaft are being worked on, comprising:

normally inactive secondary sealing means adapted to be located about a portion of the shaft between said one end and the primary sealing means and including collar means for attachment in encircling relation about a selected location on said portion of the shaft and means for securing the collar means fixedly on the shaft adjacent to axially shiftable secondary sealing ring means normally free from the collar means and not movable with the shaft so as to permit the shaft and the collar means to move freely relative to the sealing ring means during operative movements of the shaft;

and actuating means operable for activating said secondary sealing ring means when the shaft is stationary to engage said collar means whereby to effect a fluid retaining seal about the shaft without axial shifting of the shaft, so that the primary sealing means can be released from sealing relation to the shaft and freely worked on substantially without leakage of fluid past the shaft;

said actuating means being operable to release and inactivate said secondary sealing ring means relative to said collar means and the shaft after the primary sealing means have been caused to resume sealing relation to the shaft.

2. In an assembly including a shaft having primary sealing means adjacent to one end for preventing leakage of fluid past the shaft while the shaft is in movable operation with its opposite end extending into fluid which may be under pressure:

means spaced from said one end of the shaft for driving the shaft;

means releasably coupling said one end of the shaft to said driving means;

collar means fixed on the shaft between said opposite end of the shaft and said primary sealing means;

normally inactive axially shiftable secondary sealing ring means located between said opposite end of the shaft and said primary sealing means and releasably effective for engaging said collar means and thereby sealing the shaft against fluid leakage and permitting said primary sealing means to be worked on;

and means for actuating said secondary sealing ring means axially between inactive and sealing engagement relation to the collar means and shaft while the shaft remains in fixed axial position;

whereby in the sealing relation of said secondary sealing ring means to the collar means and shaft said coupling may be removed to clear said one end of the shaft and permit the primary sealing means to be removed and replaced.

3. An assembly according to claim 2, including supporting structure located in spaced relation about the shaft between said opposite end of the shaft and said primary sealing means, said actuating means being carried by said supporting structure.

4. An assembly according to claim 3, wherein said actuating means comprise mechanical structure movably carried by said supporting means.

5. An assembly according to claim 3, wherein said actuating means comprise pressure fluid circuitry, and means for controlling the circuitry.

6. An assembly according to claim 2, wherein said secondary sealing ring means serve as shaft supporting means actuated by said actuating means to move into collar means engaging and shaft supporting position when the secondary sealing ring means are activated and to move out of shaft supporting position when the secondary sealing ring means are inactivated.

7. An assembly according to claim 6, wherein said collar means comprise a pair of axially spaced shoulder collar rings fixedly mounted on the shaft, and said secondary sealing and supporting means comprise complementary wedging rings movable into active and inactive positions relative to said shoulder collar rings.

8. A device for temporarily supporting a normally operatively movable shaft when one end of the shaft is separated from primary shaft supporting and driving means, comprising:

normally inactive secondary shaft supporting means located about an intermediate portion of the shaft;

and actuating means operable for activating said secondary supporting means to effect stabilized support of the shaft without axial shifting of the shaft while the shaft is separated from said primary shaft supporting and driving means;

said actuating means being operable to inactivate said secondary shaft supporting means relative to the shaft after said one end of the shaft has been rejoined to the primary supporting and driving means, said secondary supporting means comprising axially spaced collar shoulder rings and means for fixing them on the shaft intermediate portion, and wedging rings adapted to be supported about said shaft intermediate portion and to be actuated by said actuating means.

9. A device according to claim 8, including a support housing located about said intermediate portion of the shaft, said secondary shaft supporting means and actuating means being at least in part carried by said housing.

10. A device according to claim 9, wherein said actuating means comprise a mechanical assembly.

11. A device according to claim 9, wherein said actuating means comprise pressure fluid circuitry involving said housing structure and said wedging rings.

12. A device according to claim 8, including coupling means for drivingly connecting the shaft to the primary shaft supporting and driving means, said coupling means being removable from the shaft.

13. A device according to claim 12, wherein said coupling means comprise a split tubular coupling structure, means for keying the coupling structure to the shaft, and means for removably securing the coupling to the primary shaft supporting and driving means.

14. A device for temporarily supporting a normally operatively movable shaft while stationary when one end of the shaft is separated from primary shaft supporting and driving means, comprising:

normally inactive secondary shaft supporting means located about an intermediate portion of the shaft;

actuating means operable for activating said secondary supporting means to effect stabilized support of the stationary shaft without axial shifting of the shaft while the shaft is separated from said primary shaft supporting and driving means;

coupling means for drivingly connecting the shaft to the primary shaft supporting and driving means, said coupling means being removable from the shaft;

said coupling means comprising a split tubular coupling structure;

means for keying the coupling structure to the shaft;

and means for removably securing the coupling structure to the primary shaft supporting and driving means.

15. A device according to claim 14, wherein said secondary supporting means comprise collar means and means for securing the collar means about said intermediate portion of the shaft, and ring means adapted to be mounted about the intermediate portion of the shaft and normally out of engagement with the collar means but activated in axial direction by the actuating means for engaging the collar means for supporting the shaft.

16. A device according to claim 14, wherein said secondary supporting means comprise axially spaced collar shoulder rings fixed on the intermediate portion of the shaft, a stationary housing structure enclosing said intermediate portion of the shaft, and axially shiftable wedging rings supported on said housing structure about the intermediate portion of the shaft and actuated axially by said actuating means into and out of shaft supporting engagement with the collar shoulder rings.

17. A device according to claim 16, wherein said actuating means comprise a mechanical assembly.

18. A device according to claim 16, wherein said actuating means comprise pressure fluid circuitry involving said housing structure and said wedging rings.

19. A device according to claim 1, wherein said collar means comprise a spaced pair of collars and said secondary sealing ring means include a complementary pair of spaced rings adapted to be actuated by said actuating means selectively into and out of shaft supporting engagement with said collars.

20. A device according to claim 19, wherein said collar means comprise a pair of axially spaced shaft-supported collar members, a stationary supporting structure having said actuating means, and a pair of secondary sealing ring members carried by said supporting structure and movable by said actuating means selectively into and out of supporting and sealing engagement with the shaft-supported collar members.

21. A device according to claim 20, wherein said actuating means comprise mechanical actuators.

22. A device according to claim 20, wherein said actuating means comprise a pressure fluid system and control means.

* * * * *